(12) United States Patent
Hattig

(10) Patent No.: US 6,466,549 B1
(45) Date of Patent: Oct. 15, 2002

(54) BROADCAST DISCOVERY IN A NETWORK HAVING ONE OR MORE 1394 BUSES

(75) Inventor: Myron P. Hattig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/290,356

(22) Filed: Apr. 12, 1999

(51) Int. Cl.[7] .............................................. H04L 12/40
(52) U.S. Cl. ...................................... 370/254; 370/257
(58) Field of Search ................................ 370/254, 257, 370/255, 453, 457; 379/102.03

(56) References Cited

U.S. PATENT DOCUMENTS

| | | | |
|---|---|---|---|
| 5,732,086 A | * | 3/1998 | Liang et al. ................. 370/410 |
| 5,815,678 A | * | 9/1998 | Hoffman et al. |
| 5,933,416 A | * | 8/1999 | Schenkel et al. ............ 370/254 |
| 5,933,430 A | * | 8/1999 | Osakabe et al. |
| 5,937,175 A | * | 8/1999 | Sescila |
| 6,101,528 A | * | 8/2000 | Butt ............................. 709/203 |
| 6,160,796 A | * | 12/2000 | Zou ............................ 370/257 |

FOREIGN PATENT DOCUMENTS

| | | |
|---|---|---|
| EP | 0854605 | 7/1998 |
| EP | 0874498 | 7/1998 |

* cited by examiner

*Primary Examiner*—Douglas Olms
*Assistant Examiner*—Ken Vanderpuye
(74) *Attorney, Agent, or Firm*—Blakely, Sokoloff, Taylor & Zafman LLP

(57) ABSTRACT

A method and apparatus for providing broadcast discovery in a network having one or more 1394 buses is disclosed. Devices connected to a bus generate advertised discovery information upon either a reset of the bus or a receipt of a solicit packet sent to all devices in the network by a discovering device. The devices generate the advertised discovery information upon the receipt of the solicit packet if the solicit packet contains either a global bus identifier or a bus identifier associated with the bus to which the devices are connected. The discovering device receives the advertised discovery information sent by the devices. Based on the advertised discovery information, the discovering device maintains a list of devices and services included within the devices.

20 Claims, 5 Drawing Sheets

BROADCAST DISCOVERY IN A NETWORK HAVING ONE OR MORE 1394 BUSES

FIELD OF THE INVENTION

This invention relates to discovery protocols generally, and more particularly to a method and apparatus for providing broadcast discovery in a network having one or more 1394 buses.

BACKGROUND OF THE INVENTION

The Institute of Electrical and Electronic Engineers (IEEE) has promulgated a standard for transmission of multimedia data over a serial communications channel. This standard has been identified as IEEE std. 1394-1995, published Jun. 16, 1995 (1394). The 1394 standard provides a high-speed serial bus that can transfer data between personal computers (PCs), peripheral devices (i.e. any hardware device connected to a computer, such as a monitor, keyboard, printer, scanner, etc.) and consumer electronic devices, using the same physical transmission medium. The 1394 serial bus has inherent plug-n-play capabilities for applications on devices coupled to the 1394 bus. Devices can be added and removed from a 1394 bus while the bus is active. If a device is so added or removed, the bus will then automatically reconfigure itself for transmitting data between the existing nodes.

Interactions between applications on different devices in a network depend on the discovery of devices and services contained within the devices. The technique currently used for providing discovery of devices and services is limited in its efficiency and extensibility. Under this current technique referred to as "Learn Node ID Then Interrogate" discovery, discovery of devices and services occurs only after bus resets. Specifically, a reset of a 1394 bus causes a hardware initialization, which in turn triggers all devices on the bus to send packets with their device identification information to a discovering device, i.e. a device that performs discovery. The discovering device stores the device identifiers. After the hardware initialization completes, the discovering device interrogates the other devices on the bus to learn about their services. The interrogation is performed in the form of 1394 asynchronous read transactions. Each asynchronous read transaction used within the 1394 environment consists of a request packet and a response packet and can read only four bytes of data at a time.

The device and service discovery information of each device is contained in its configuration read only memory (ROM) defined in 1394 specification. Thus, when the discovering device interrogates other devices on the bus, it needs to read the configuration ROM of every device on the bus. Consequently, the number of packets generated during the "Learn Node ID Then Interrogate" discovery depends on the size of the device's configuration ROM and on the number of devices on the bus. The formula for calculating the number of packets is as follows:

(N−1)xDxSx2, where N is the number of devices on the bus, D is the number of devices performing discovery, S is the size of the device's configuration ROM divided by four (the configuration ROM transactions read four bytes per transaction), and 2 represents that there are two packets—a request and response packet—for each read transaction. Thus, for example, in a network with four devices, including three discovering devices, and 150 bytes of the device's configuration ROM, the "Learn Node ID Then Interrogate" discovery generates 684 packets.

As a result of such a high number of generated packets, the current discovery technique occasionally fails in 1394 networks with three or four devices because some devices cannot respond to the burst of configuration ROM read transactions. That is, a device receives too many transactions in a short period of time which causes the device to lose control of the order of responses to these multiple transactions. The problem increases greatly with larger 1394 networks that exist when multiple buses are connected through a bridge.

Another problem with the "Learn Node ID Then Interrogate" discovery is that it may cause bus reset storms in a network with multiple 1394 buses bridged together. Specifically, a reset of a bus initiates discovery of services and devices on this bus. To obtain information about services and devices on other buses in the network, the initial bus reset must be forwarded from one bus to another. Forwarding bus resets from one bus to another bus may generate a bus reset on the bus to which the bus reset was forwarded. This bus reset is subsequently forwarded back to the other bus which again may cause another bus reset. This pattern, known as a bus reset storm, may continue indefinitely thus rendering the entire 1394 bus useless. Therefore, the "Learn Node ID Then Interrogate" discovery cannot be used in networks with multiple 1394 buses.

The risk of causing bus reset storms also exists in a home network, in which a 1394 network is connected to a non-1394 network so that, for example, PCs with non-1394 interfaces can interact with 1394 devices. Similarly to the operation of the "Learn Node ID Then Interrogate" discovery in a network with multiple 1394 buses, the operation of this technique in a 1394 network connected to a non-1394 network may require bus resets to be forwarded to the non-1394 network. As discussed above, forwarding bus resets may lead to bus reset storms which interfere with proper functioning of the devices in the network. Thus, the "Learn Node ID Then Interrogate" discovery cannot be used in neither networks with multiple 1394 buses nor in 1394 networks connected to non-1394 networks.

Therefore, there is a need for an efficient and extensible broadcast discovery protocol which allows discovery of devices and services in a network with multiple 1394 buses and extends to a non-1394 network connected to multiple 1394 buses.

SUMMARY OF THE INVENTION

A method and apparatus for providing broadcast discovery in a network having one or more 1394 buses is disclosed. Devices connected to a bus generate advertised discovery information upon either a reset of the bus or a receipt of a solicit packet sent to all devices in the network by a discovering device. The devices generate the advertised discovery information upon the receipt of the solicit packet if the solicit packet contains either a global bus identifier or a bus identifier associated with the bus to which the devices are connected. The discovering device receives the advertised discovery information sent by the devices. Based on the advertised discovery information, the discovering device maintains a list of devices and services included within the devices.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. A preferred embodiment of the present invention, described below, enables interactions between applications on different devices in a network.

In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

Figure 2:
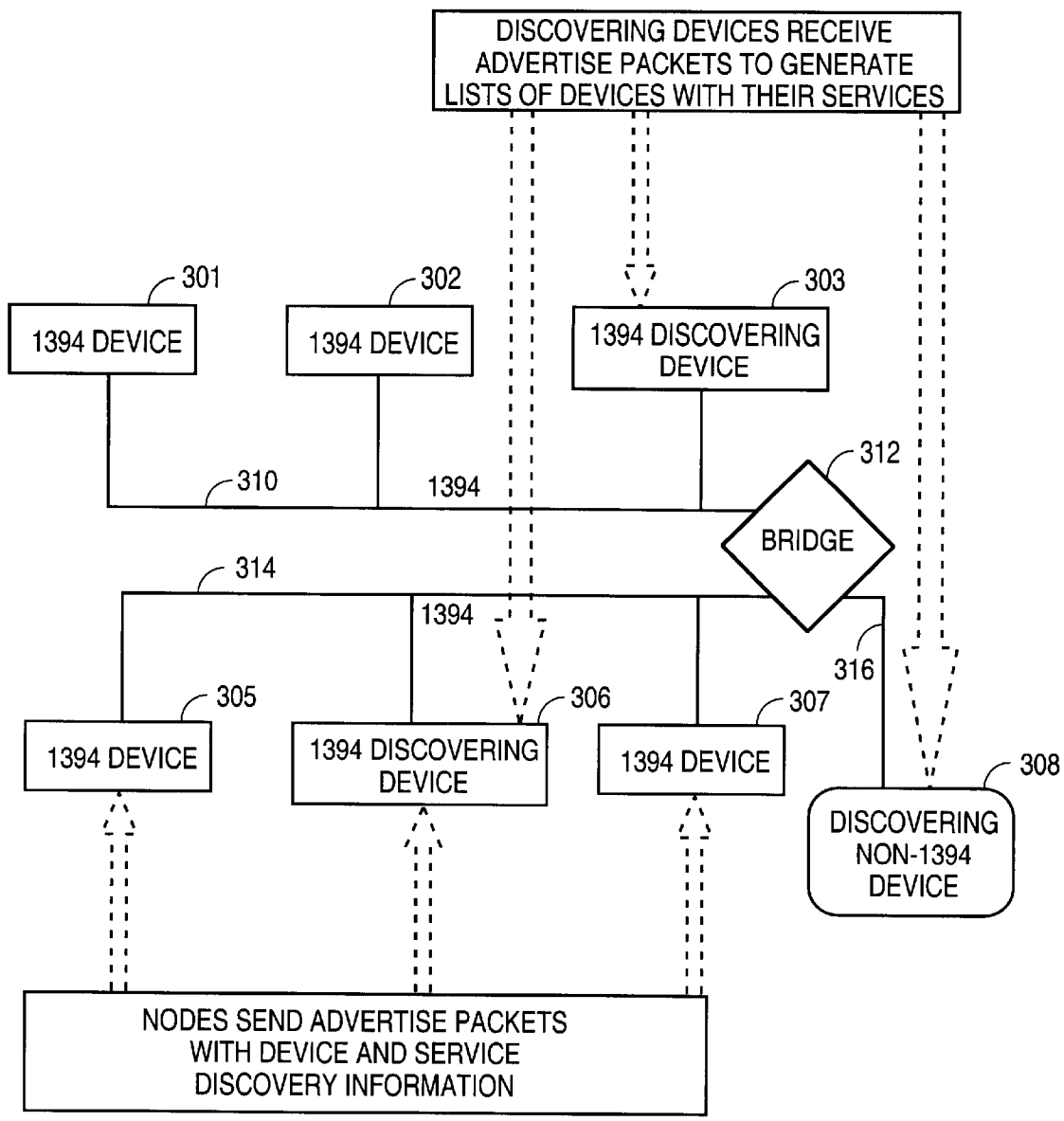
FIG. 2 illustrates the block diagram of one embodiment's advertisement phase.

This invention can be practiced in a variety of representative networks. FIG. 2 demonstrates a block diagram of a network of one embodiment of the present invention. In this embodiment, a home network consists of digital consumer electronic devices which pass digital control data, audio streams, and video streams to each other. Typical digital consumer electronic devices include, but are not limited to, digital camcorders, digital cameras, digital VCRs, digital TVs, "kitchen" computers, etc. It will be recognized by one of ordinary skill in the art that a wide variety of digital consumer electronic devices other than that discussed above may be used with the present invention without loss of generality. In addition, the present invention can be used in networks including a wide variety of PCs, cable modems and peripheral devices without departing from the spirit of the invention.

Figure 1:
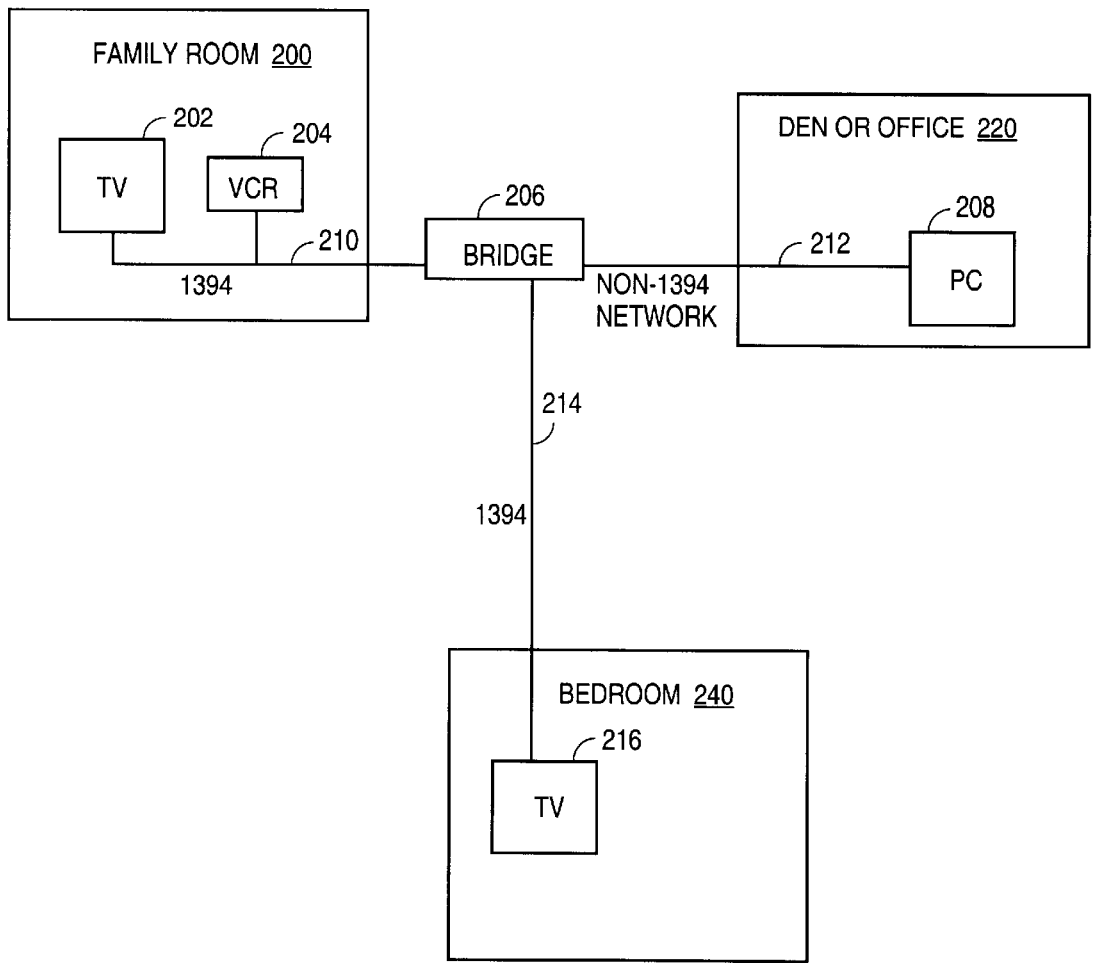
FIG. 1 illustrates the block diagram of a network of one embodiment of the present invention.

FIG. 1 shows TV 202 and VCR 204 that are located in family room 200. TV 216 is located in bedroom 240. TV 202 and VCR 204 are coupled to 1394 bus 210. TV 216 is coupled to 1394 bus 214. 1394 bus 210 and 1394 bus 214 are connected to each other through bridge 206. TV 202, VCR 204 and TV 216 are devices that support IEEE 1394 and have 1394 interfaces, including, but not limited to, Microsoft IEEE 1394 class drivers. It will be recognized by one of ordinary skill in the art that a wide variety of other 1394 interfaces may be used with the present invention without loss of generality. In addition, the devices can support 1394 interface in concert with other standard interfaces, including, but not limited to, Universal Serial Bus (USB) interface.

1394 buses 210 and 214 have inherent plug-and-play capabilities and allow users to attach or remove devices at any time, even with the bus being in full operation. High-speed 1394 buses 210 and 214 allow various interactions between applications on the devices 202, 204 and 216. For example, a user may be able to tell VCR 204 to pause the current video playing in family room 200, wait five minutes, and then resume playing the video on TV 216 in bedroom 240.

In one embodiment, it is possible that 1394 buses 210 and 214 are connected to non-1394 network 212 through bridge 206. Typical non-1394 networks in a home networking environment may include, but are not limited to, Home Phoneline Networking Alliance (HomePNA), Home Radio Frequency (HomeRF), Ethernet, etc. It will be recognized by one of ordinary skill in the art that a wide variety of non-1394 networks other than that discussed above may be used with the present invention without loss of generality.

In one embodiment, non-1394 network 212 includes PC 208 located in den or office 220. PC 208 does not have a 1394 interface but includes 1394 applications. With the present invention, 1394 applications on PC 208 can interact with 1394 devices 202, 204 and 216. For example, a user can communicate to PC 208 through the television screen of TV 202 or TV 216, use PC 208 for searching audio-video devices in the home to locate a certain movie, etc. It should be emphasized that various PCs and various devices other than PCs may be included in non-1394 networks without departing from the spirit of the present invention.

Operation of the Present Invention

The present invention provides a method and apparatus for providing broadcast discovery in a network having one or more 1394 buses. Specifically, the present invention is an advertise and solicit protocol. Discovery of devices and services contained within the devices is accomplished during advertisement actions and solicit actions. Discovery information sent by devices during the advertisement actions and solicit actions allows discovering devices to maintain a list of devices and services in the network. With the present invention, discovery of devices and services generates an insignificant number of packets of information as compared to prior art described above. Therefore, the present invention avoids discovery failures related to bursts of packets. In addition, the present invention broadcasts solicit and advertise packets to all devices in the network which obviates the need to forward bus resets from one bus to another, thereby avoiding bus reset storms in networks with multiple 1394 buses and non-1394 networks. Thus, the present invention allows effective discovery of devices and services in multiple bus 1394 networks and enables PCs with non-1394 interfaces to interact with 1394 devices.

FIG. 2 illustrates an advertisement action of one embodiment of the present invention. An advertisement action may be triggered by a bus reset. Typically, a bus reset occurs when a device is turned off or on, added to or removed from the bus, or application software forces a bus reset at any time for error handling or for some other activity. It will be recognized by one of ordinary skill in the art that a wide variety of events other than that discussed above may trigger a bus reset in the present invention without departing from the spirit of the invention.

Upon a bus reset, all devices connected to the bus broadcast their advertise packets. As shown in FIG. 2, a reset of 1394 bus 314 initiates devices 305, 306 and 307 connected to bus 314 to advertise their discovery information. The advertised discovery information sent by each device includes the information about the device and services contained within the device. Some of the devices in the network are assigned the task of performing discovery. These devices are called discovering devices. Discovering devices 303, 306 and 308 receive the advertised discovery information sent by devices 305, 306 and 307. Based on this information, each discovering device generates a list of devices connected to bus 314 and services contained within these devices. This list is used to update the existing list of devices and services that is maintained by each discovering device with current information about the devices connected to bus 314.

A discovering device may need to obtain refreshed or new discovery information about all devices in the network. In addition, the discovering device may have incomplete or outdated information about certain devices in the network. When either entire or partial discovery information is needed, the discovering device may initiate a solicit action. The solicit action may be triggered when the discovering device fails to receive any portion of advertised discovery information due to a broadcast error, when a topology change occurs without a bus reset, when an application requests refreshed or new discovery information, etc. It will be recognized by one of ordinary skill in the art that a wide variety of events other than that discussed above may trigger a solicit action in the present invention without departing from the spirit of the invention.

Figure 3:
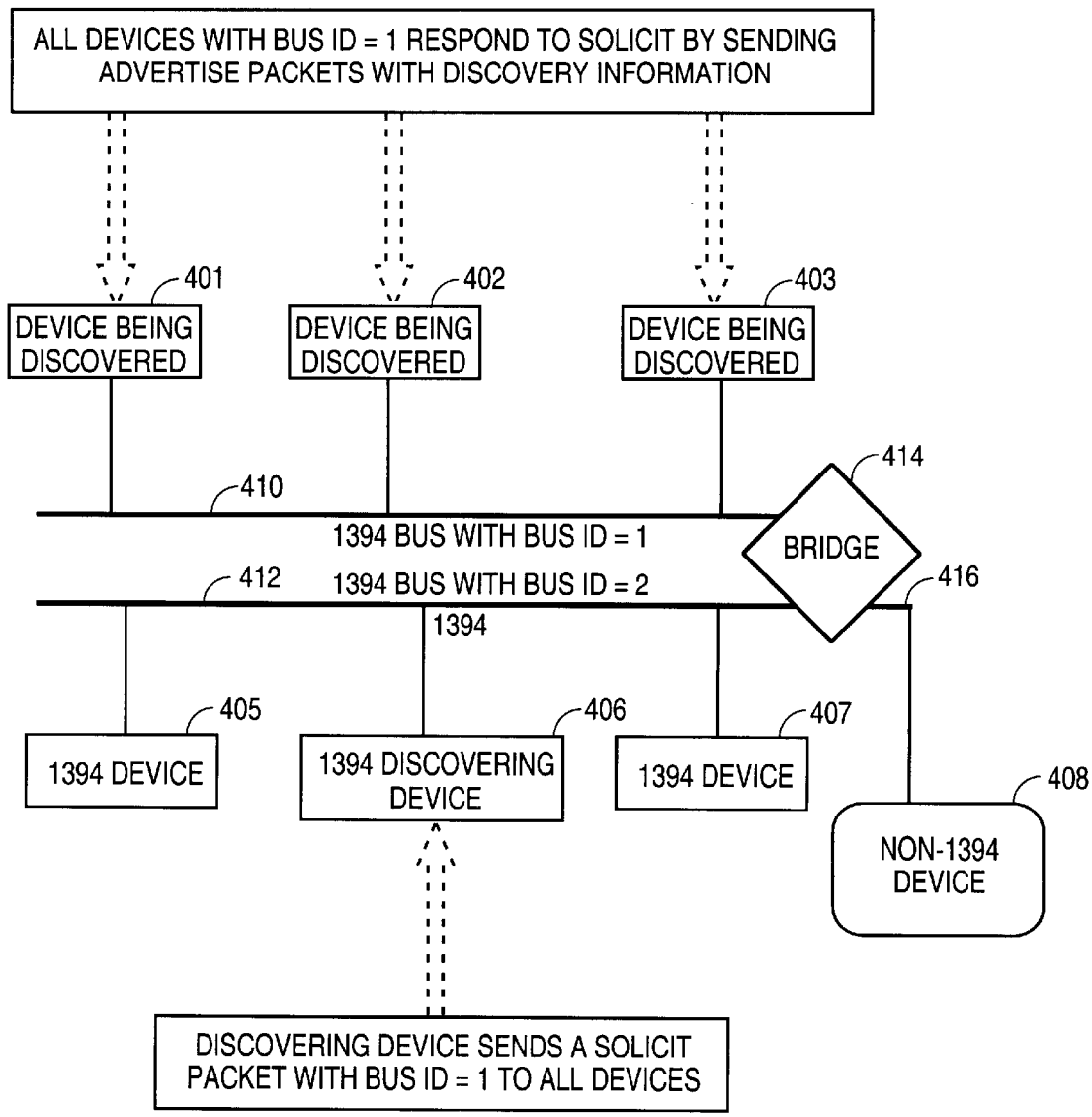
FIG. 3 illustrates the block diagram of one embodiment's solicit phase.

FIG. 3 illustrates a solicit action of one embodiment of the present invention. In this embodiment, discovering device 406 initiates a solicit action upon discovering that it has incomplete information about devices connected to 1394 bus 410. Discovering device 406 broadcasts a solicit packet which is received by all devices in the network. In this embodiment, discovering device 406 needs to solicit discovery information only from devices connected to bus 410. To initiate transmission of discovery information only by the devices connected to bus 410, the solicit packet specifies a bus identifier (bus id) assigned to bus 410. In FIG. 3, for illustrational purposes only, bus 410 is assigned bus id equal to 1. When devices in the network receive the solicit packet from discovering device 406, they compare the bus id to which they are connected with the bus id contained in the solicit packet. If the bus id to which a device is connected matches the solicited bus id, the device responds to the solicit packet. In FIG. 3, devices 401, 402 and 403 are connected to bus 410 which has a bus id equal to 1 as requested in the solicit packet. Therefore, only devices 401, 402 and 403 respond to the solicit packet by advertising their discovery information. The discovery information sent by devices 401, 402 and 403 in response to the solicit packet includes information about the devices and services contained within the devices. Discovering device 406 receives the advertised discovery information and uses this information to update the existing list of devices and services with the current information about devices connected to bus 410.

It should be emphasized that, although FIG. 3 shows soliciting discovery information from devices on an individual bus, other variations of solicit actions may be used without departing from the scope of the present invention. Thus, a global solicit action may be initiated by a discovering device when the discovering device needs to obtain discovery information from all devices in the network. If discovering device 406 discovers that it needs information about all devices in the network, discovering device 406 sends a solicit packet with a bus id representing a global bus id. For example, the global bus id may be equal to 64 because a network cannot have more than 63 buses. However, it will be recognized by one of ordinary skill in the art that any other number may be assigned to represent the global bus id without loss of generality. When devices in the network receive the solicit packet with the global bus id, all the devices in the network send their advertised discovery information to discovering device 406. This discovery information is then used by discovering device 406 to maintain a list of all devices in the network and services included within each device.

In one embodiment of the present invention, non-1394 network 416 is connected to multiple 1394 buses 410 and 412 through bridge 414. If discovering device 406 discovers that it is missing information about non-1394 device 416, discovering device 406 initiates a solicit action to solicit information from devices connected to non-1394 network 416. Non-1394 network 416 is assigned a simulated bus id. Discovering device 406 includes the simulated bus id in a solicit packet. Again, all devices in the network receive the solicit packet, but only devices connected to a bus with a bus id equal to the bus id from the solicit packet respond. In FIG. 3, only non-1394 device 408 has a bus id matching the simulated bus id from the solicit packet. Consequently, only non-1394 device 408 sends its advertised discovery information to discovering device 406 which uses this information for maintaining a current list of services and devices in the network.

With the present invention, the number of packets generated during discovery is significantly lower than with prior art. As described in the Background Section of this Specification, prior art generates 684 packets during discovery in a network similar to the network illustrated in FIG. 1, i.e. in a network with four devices including three discovering devices. The number of 684 is also based on the size of the device's configuration ROM of 150 bytes.

The present invention does not depend on the number of discovering devices in the network because discovery information in the present invention is broadcasted to all devices in the network. Neither does the present invention uses configuration ROM read transactions which read only four bytes per a transaction and require each transaction to include a request packet and a response packet. Instead, a device in the present invention retrieves discovery information from the device's configuration ROM and broadcasts the discovery information in the form of asynchronous streams to all devices in the network. Typically, the number of packets required for sending discovery information of a device is between two and three. With the present invention, the number of packets generated during discovery depends only on the number of devices in the network and the number of packets required for sending discovery information of a device. Specifically, the number of packets generated during discovery is NxP where N is the number of devices and P is the number of packets required for sending discovery information. Thus, in a network similar to the network described in FIG. 1, the present invention generates 12 packets maximum, as compared to 684 packets generated by prior art.

Figure 4:
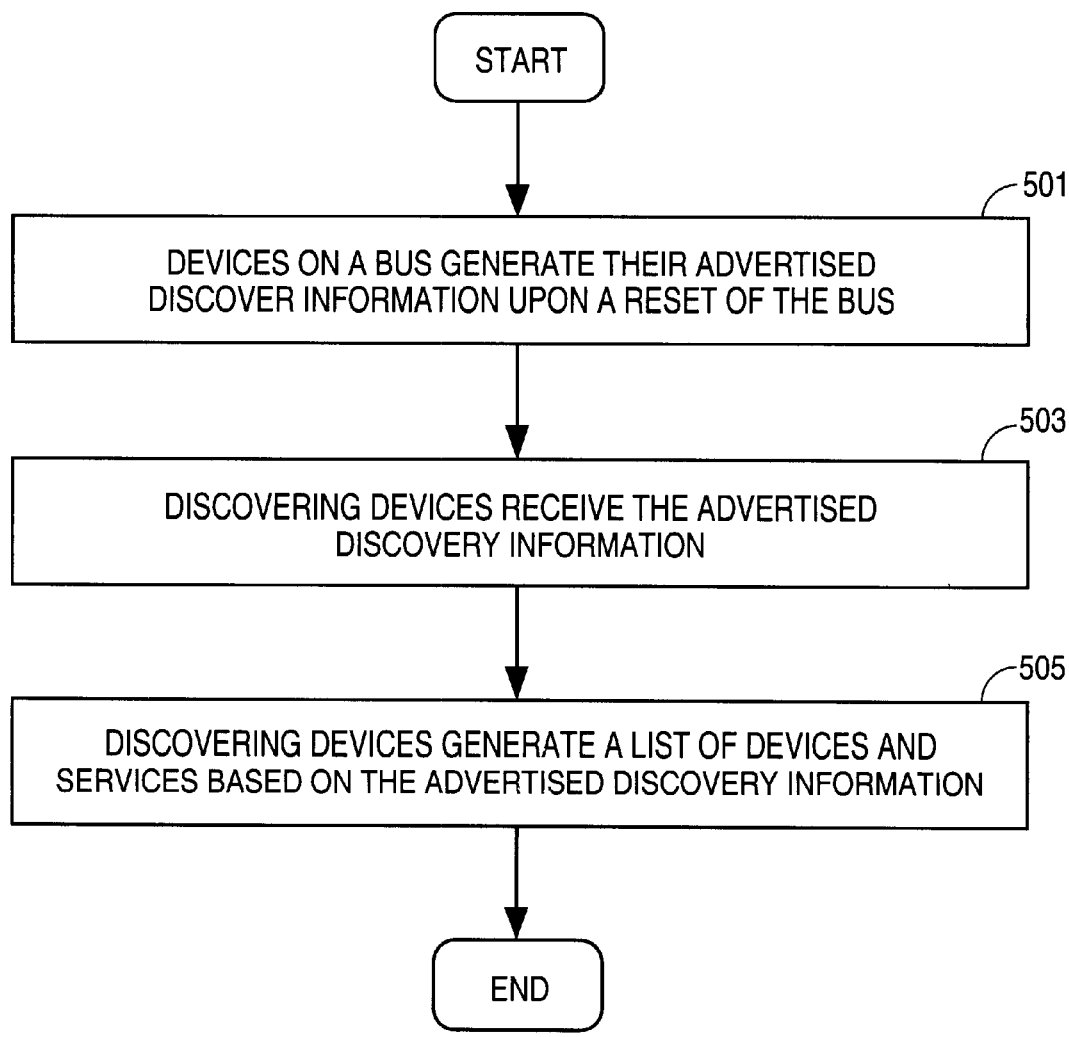
FIG. 4 illustrates a flow chart for one embodiment's advertisement phase.

FIG. 4 illustrates a flow chart detailing the steps of the advertisement phase of one embodiment of the present invention. Discovery of devices and services in a network may be initiated by a bus reset. Upon the bus reset, all devices connected to the bus advertise their discovery information, as shown in step 501. The discovery information sent by each device includes information about this device and services contained within this device. All discovering devices in the network receive the advertised discovery information, as shown in step 503. At step 505, each discovering device generates a list of devices connected to the reset bus and services contained within these devices. The generated list is used to update the existing list of devices and services in the network which is maintained by each discovering device.

Figure 5:
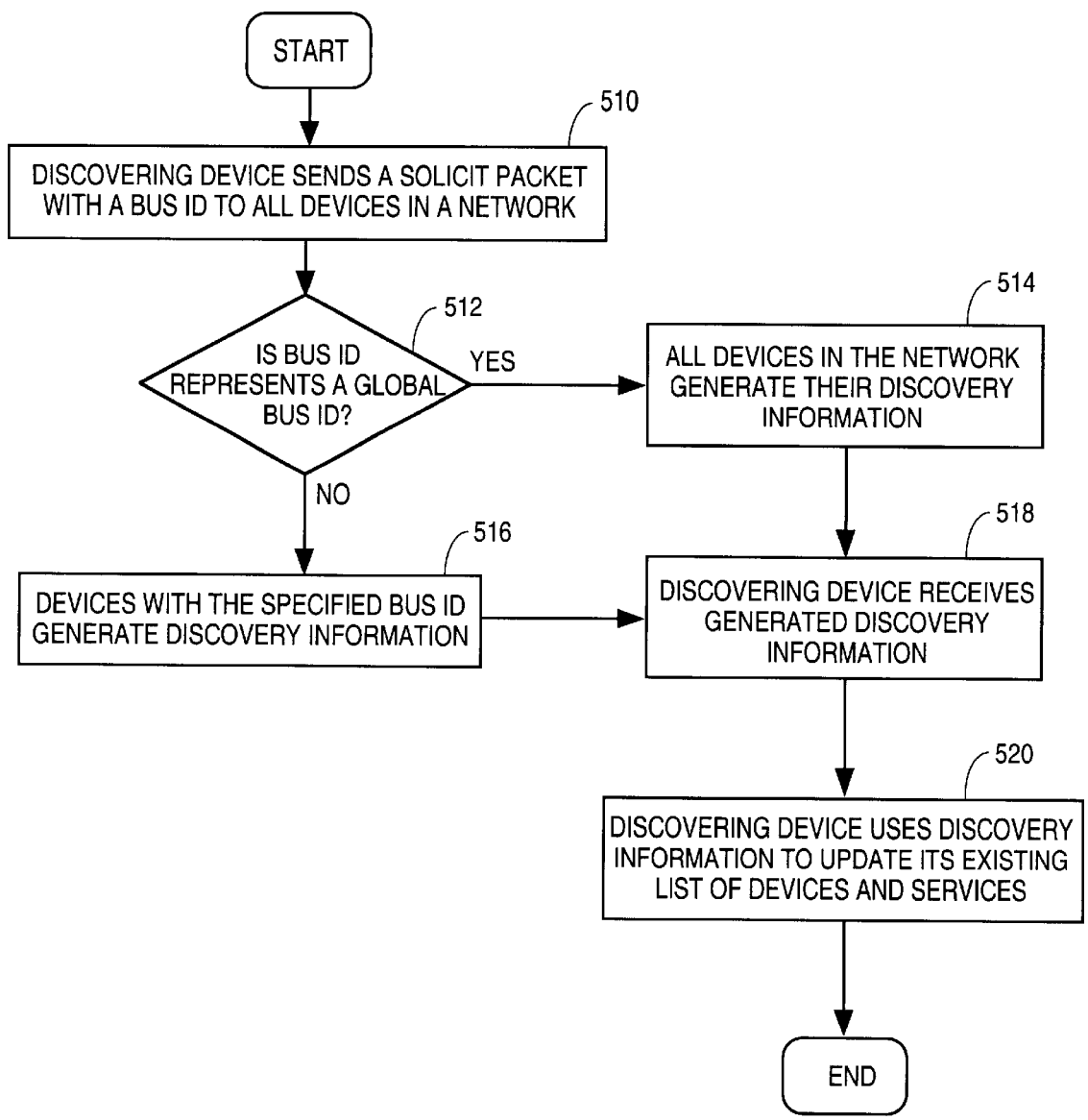
FIG. 5 illustrates a flow chart for one embodiment's solicit phase.

Discovery of devices and services in the network may also occur during a solicit action. FIG. 5 illustrates a flow chart detailing the steps of the solicit phase of one embodiment of the present invention. As discussed above, a discovering device may need to obtain partial or global discovery information about devices in the network and their services. Upon discovering the need to obtain discovery information, the discovering device generates a solicit packet which includes some bus id. At step 510, the discovering device sends the solicit packet with the above bus id to all devices in the network. If the above bus id represents a global bus id, the flow goes from step 512 to step 514. That is, upon receipt of the solicit packet with the global bus id, all devices in the network generate their advertised discovery information, as shown in step 514.

If the bus id included in the solicit packet does not represent the global bus id, then the discovering device needs to obtain discovery information only from devices connected to a certain bus. The id of this bus is included in the solicit packet. All the devices in the network receive the solicit packet and compare the bus id assigned to their bus with the solicited bus id. As discussed above, a non-1394 network is assigned a simulated bus id. Thus, when the discovering device needs information about devices connected to the non-1394 network, the solicit packet includes the simulated bus id that represents the non-1394 network.

At step 516, devices connected to a bus that has a bus id matching the solicited bus id generate their advertised discovery information. At step 518, the discovering device receives the advertised discovery information either from devices connected to the specified bus or from all devices in the network in case of a global solicit action. At step 520, the discovering device uses the advertised discovery information to update its existing list of devices and services.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method to provide broadcast discovery in a network having one or more 1394 buses, comprising:
   generating advertised discovery information including device and service information of devices connected to a bus upon an occurrence of at least one of a number of events including a reset of said bus and a receipt of a solicit packet sent to all devices in the network by a discovering device, the network including a non-1394 network coupled to the one or more 1394 buses;
   receiving the advertised discovery information of the devices by the discovering device; and
   maintaining a list of devices and services included within the devices based on the advertised discovery information received by the discovering device.

2. The method of claim 1 wherein a device in the network can be a consumer electronic device, a peripheral device, a cable modem, or a personal computer.

3. The method of claim 1 wherein the non-1394 network simulates a bus with an assigned simulated bus identifier.

4. The method of claim 1 wherein said solicit packet containing a global bus identifier initiates all devices in the network to send the advertised discovery information to the discovering device.

5. The method of claim 1 wherein said solicit packet containing a bus identifier associated with said bus initiates only devices connected to said bus to send the advertised discovery information to the discovering device.

6. An apparatus to provide broadcast discovery in a network having one or more 1394 buses, comprising:
   means to generate advertised discovery information including device and service information of devices connected to a bus upon an occurrence of at least one of a number of events including a reset of said bus and a receipt of a solicit packet sent to all devices in the network by a discovering device, the network including a non-1394 network coupled to the one or more 1394 buses;
   means to receive the advertised discovery information of the devices by the discovering device; and
   means to maintain a list of devices and services included within the devices based on the advertised discovery information received by the discovering device.

7. The apparatus according to claim 6 wherein a device in the network can be at least one of the following devices including a consumer electronic device, a peripheral device, a cable modem, and a personal computer.

8. The apparatus according to claim 6 wherein the non-1394 network simulates a bus with a bus identifier equal to a simulated bus identifier.

9. The apparatus according to claim 6 wherein the means to generate advertised discovery information by devices connected to a bus further comprises:
   means to send said solicit packet containing a global bus identifier to all devices in the network; and
   means to initiate all devices in the network to send the advertised discovery information to the discovering device.

10. The apparatus according to claim 6 wherein the means to generate advertised discovery information by devices connected to a bus comprises:
    means to send said solicit packet containing a bus identifier associated with said bus to all devices in the network; and
    means to initiate only devices connected to said bus to send the advertised discovery information to the discovering device.

11. An apparatus to provide broadcast discovery in a network having one or more 1394 buses, comprising:
    an information generator to generate advertised discovery information including device and service information of devices connected to a bus upon an occurrence of at least one of a number of events including a reset of said bus and a receipt of a solicit packet sent to all devices in the network by a discovering device, the network including a non-1394 network coupled to the one or more 1394 buses;
    an information receiver to receive the advertised discovery information of the devices by the discovering device; and
    a list maintainer to maintain a list of devices and services included within the devices based on the advertised discovery information received by the discovering device.

12. The apparatus according to claim 11 wherein a device in the network can be at least one of the following devices including a consumer electronic device, a peripheral device, a cable modem, and a personal computer.

13. The apparatus according to claim 11 wherein the non-1394 network simulates a bus with an assigned simulated bus identifier.

14. The apparatus according to claim 11 wherein the information generator comprises:

a solicitor to send said solicit packet containing a global bus identifier to all devices in the network; and a device initiator to initiate all devices in the network to send the advertised discovery information to the discovering device.

15. The apparatus according to claim 11 wherein the information generator comprises:

a solicitor to send said solicit packet containing a bus identifier associated with said bus to all devices in the network; and a device initiator to initiate only devices connected to said bus to send the advertised discovery information to the discovering device.

16. A machine readable medium having embodied thereon instructions, which when executed by a machine, causes the machine to:

provide broadcast discovery in a network having one or more 1394 buses, the instructions comprising:

a first set of instructions to generate advertised discovery information including device and service information of devices connected to a bus upon an occurrence of at least one of a number of events including a reset of said bus and a receipt of a solicit packet sent to all devices in the network by a discovering device, the network including a non-1394 network coupled to the one or more 1394 buses;

a second set of instructions to receive the advertised discovery information of the devices by the discovering device; and a third set of instructions to maintain a list of devices and services included within the devices based on the advertised discovery information received by the discovering device.

17. The machine readable medium according to claim 16 wherein a device in the network can be at least one of the following devices including a consumer electronic device, a peripheral device, a cable modem, and a personal computer.

18. The machine readable medium according to claim 16 wherein the non-1394 network simulates a bus with an assigned simulated bus identifier.

19. The machine readable medium according to claim 16 wherein the first set of instructions to generate advertised discovery information by devices connected to a bus further comprises instructions to send said solicit packet containing bus identifier associated with said bus to all devices in the network and instructions to initiate only devices connected to said bus to send the advertised discovery information to the discovering device.

20. The machine readable medium according to claim 16 wherein the first set of instructions to generate advertised discovery information by devices connected to a bus further comprises instructions to send said solicit packet containing a global bus identifier to all devices in the network and instructions for initiating all devices in the network to send the advertised discovery information to the discovering device.

* * * * *